Feb. 17, 1953　　　A. L. SMITH　　　2,628,498
DRILLING RATE INDICATING DEVICE
Filed May 6, 1948

Alonzo L. Smith
INVENTOR.

BY Lester B. Clark
& Ray L. Smith
ATTORNEYS

Patented Feb. 17, 1953

2,628,498

UNITED STATES PATENT OFFICE 2,628,498

DRILLING RATE INDICATING DEVICE

Alonzo L. Smith, Houston, Tex.

Application May 6, 1948, Serial No. 25,447

10 Claims. (Cl. 73—151.5)

1

The invention relates to a drilling rate indicating device.

Heretofore in drilling rate indicators, or recorders, it has been customary to measure the amount of time required to drill a certain specified distance. This is disadvantageous in that the rotation of the drill stem is varied, depending upon the type of formation being drilled, and therefore such device will not give a true indication of the type of formation being drilled. For example, in drilling a hard formation, it is customary to rotate the drill stem at a relatively high rate of speed, and, usually, not as much formation will be drilled, or, as termed in the art, not as much footage will be made as will be when the drill stem is passing through a soft or porous formation; whereupon the drill stem is rotated at a slower rate of speed.

In some instances it is desirable to circulate the drilling mud while rotating the drill stem so as to maintain agitation and circulation of the drilling mud to prevent gelling or to work off the gas from a gas pocket while actually no hole is being drilled. Prior recorders could thus give an erroneous indication.

It seems obvious that the indication given by prior recorders might be entirely in error, since actually the time was not utilized in drilling at the maximum operating conditions. Any chart made by such a recorder would tend to show to an observer that a great deal of time was spent in making very little hole, and therefore that possibly a hard formation was being passed through.

In some instances, the charts made by these recorders are used by the engineers to check the type of the fault in other wells being drilled on the location. That is to say, an operator will then look on his chart obtained from a previous well, wherein possibly several repairs were necessary during the drilling of the well, and if an attempt is made to try to correlate the formation of the previous well with the one being drilled, error will be encountered. In view of the fact that some formations are only a foot to six feet thick, it therefore seems obvious that if a previous chart is erroneously relied upon to indicate the production level, it might be that other wells drilled on the location will be reported as dry holes, whereas if a true indication had been given by the depth chart it would actually show the nature of the formation being drilled. Thus it would become a relatively simple matter to correlate the charts obtained from various wells, and in this manner it would be

2 possible to determine the type of the formation and the particular course it takes on the location. With this knowledge at hand, the engineer can then determine the most advantageous depth at which to bring the oil well in.

It is an object of the present invention to provide a drilling rate indicator which measures the revolutions that the drilling bit turns in cutting out a predetermined amount of formation, regardless of the speed of the rotary table.

Another object of the invention is to provide a drilling rate device wherein the revolutions of the rotary table are compared with a predetermined amount of travel of the drilling bit into the formation.

Another object of the invention is to determine the number of revolutions of the rotary table required per drilling foot of the formation, which will serve as an indication of the type formation being drilled.

Another object of the invention is to provide, in addition to the usual equipment on a drilling derrick, which includes a traveling block suspended therein to support a string of drill pipe, means to indicate downward movement of said drill pipe, means to indicate the number of revolutions of the drill pipe while drilling, and additional means to compare said above indications to determine the total number of revolutions of the drill pipe per unit of downward travel thereof.

Still another object of the invention is to provide a method of determining the number of revolutions of the drill pipe suspended in a derrick by a traveling block and comparing the number of revolutions of said drill pipe required to move said drill pipe downwardly through a predetermined amount of formation.

Other and further objects and advantages of the invention will become more readily apparent from a consideration of the following description and drawing, wherein.

Figures 1, 2:
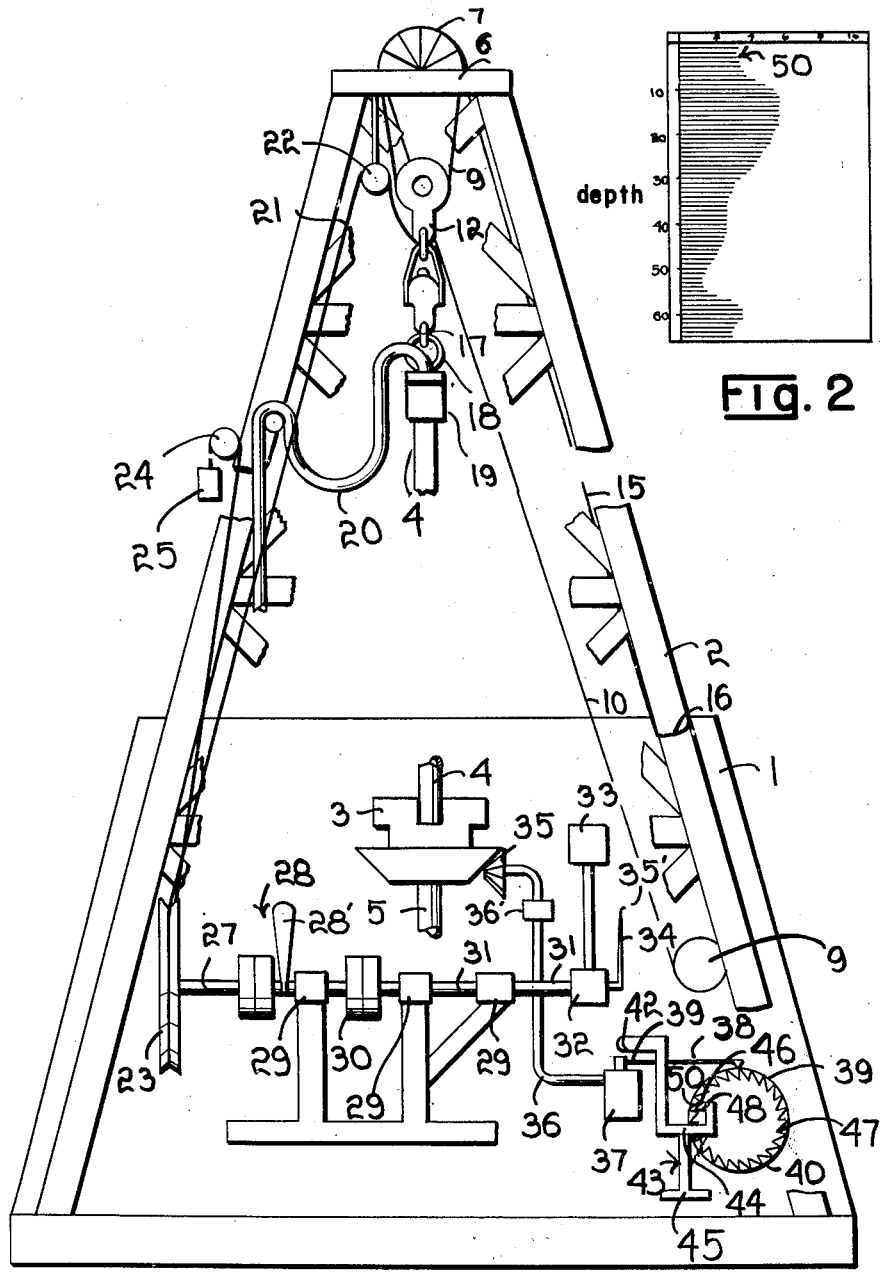
Fig. 1 is an elevation of a portion of a drilling rig showing an arrangement schematically of the invention.
Fig. 2 illustrates the type of chart obtained when using the invention described and claimed herein.

The invention is shown as being arranged on the floor 1 of an ordinary drilling rig, or derrick 2; supported on the drill floor 1 is the usual rotary drilling device 3, through which rotary motion is imparted through the kelly 4 and connected length of pipe 5.

At the upper end of the derrick 2 there is arranged crown block 6, having a plurality of sheaves 7 thereon. A hoist reel 9 is arranged adjacent the lower end of the derrick through which the cable 10 is adapted to be handled during the drilling operation. The cable 10 passes over the sheave 7 of the crown block, and then passes downwardly over the traveling block 12, and thence upwardly again back over the crown block. The dead line 15 extends from the crown block to any suitable point, such as 16 on the derrick 2. The traveling block 12 is thus suspended in the derrick and is adapted to be moved relatively thereto. The traveling block 12 is provided with a hook 17, which engages the bail 18 of the swivel 19, to which the drive kelly 4 is secured. Secured to the swivel 19 is a hose 20 through which drilling fluid or drilling mud is conducted, and thence into the kelly 4. Attached to the traveling block 12 is a line 21 which passes over the pulley or sheave 22 adjacent the top of the derrick. The cable 21 extends downwardly and passes over the calibrated sheave 23 and then back up over the sheave 24, and has the weight 25 secured on the end thereof. Arranged axially of the calibrated pulley 23 is a rod or shaft 27 upon which is mounted the throw-out clutch assembly denoted generally at 28. The clutch handle 28' can be used to disengage the drive through the rod or shaft 27. A plurality of vertical supports 29 are arranged to provide support to the shaft or rod 27.

Adjacent the throw-out clutch assembly 28 is the one way rotating clutch 30. This one way rotating clutch is designed to rotate the portion 31 of the shaft 27 only when the traveling block is moving downwardly. Suitable gear reduction means are provided at 32, which transforms the revolutions of the portion 31 of the shaft 27 to footage or depth indication, as illustrated at 33. A sweep arm 34 is arranged substantially in a retired plane and rotates in accordance with movement of the calibrated pulley 23.

The rotary table 3 is provided with suitable means such as the bevel gear 35 operably secured thereto. The rotation of the rotary table 3 and of the bevel gear 35 will be in unison, and suitable gear reduction means are provided at 36' through which is imparted or communicated by suitable means, such as the drive cable 36 to the reduction gear and driving element denoted at 37. Operably secured to the driving element 37 is a stylus 38 arranged to engage the periphery 39 of the drum 40. Rotation of the rotary table will be indicated by the stylus moving across the chart, as better illustrated in Fig. 2.

While it is believed that the operation of the invention is apparent from the foregoing, by way of further illustration and amplification, it will be assumed that the invention is arranged on a rotary drilling rig such as that used in drilling oil, gas or water wells. As the traveling block 12 moves downwardly in the derrick, due to the bit traveling down through the formation being drilled, the cable 21 will become taut and will impart rotation to the calibrated pulley 23, due to the fact that the weight 25 keeps the other end of the cable 21 taut. As rotation is imparted to the calibrated pulley 23, the shaft 27 will rotate. Since the one way clutch 30 is arranged to rotate in response to downward movement of the traveling block 12, rotation of the shaft 27 will be imparted to the portion 31 thereof. Rotation of the portion 31 will be noted on the footage indicator 33, and such rotation will also serve to move the sweep arm 34. Upon each revolution of the calibrated pulley the sweep arm 34 can be set to move a predetermined distance, such as to indicate one foot of formation. While this operation is occurring the rotary table is imparting rotation to the drill stem supported in the derrick, and the number of revolutions of such drill stem is imparted through the gear 35 to the stylus indicating means 38.

In order to correlate or establish a relationship between the total number of revolutions required to drill a predetermined distance through the formation, the sweep arm is arranged so that the end 35' thereof will strike the stylus 38 adjacent the portion 39 thereof. This will serve to move the stylus indicating arm back to the zero point on the chart on each revolution of the sweep arm. At the same time, or immediately after moving the stylus 38 back to zero, the sweep arm 34 contacts the lever 42 of the drum rotating means 43. Contact of the lever 42 by the sweep arm 34 tends to pivot the lever about the point 44 on the stand 45. This engages the point 46 in the ratchet teeth 47 of the drum, whereupon the drum is rotated one notch. The point 46 is telescopically mounted in the arm 48, so that after it has moved the drum one notch, the point 46 can move inwardly to ride over the slanted surface of the adjacent ratchet tooth, as shown at 50. In this manner for each revolution of the sweep arm, which is calibrated to revolve in accordance with the calibrated pulley 23, the number of revolutions required of the rotary table to drill a certain depth of formation, determined by the relation of the sweep arm 34 to the calibrated pulley 23, is obtained.

Any suitable means could be used to determine downward movement of the traveling block 12 such as photographic means, electric eye, selsyn motor, pressure static head, magnetic counter, etc. Similarly, any suitable electronic means could be used to determine the number of revolutions of the drilling table and any suitable means for transmitting this determination to an indicating device can be used, and thereafter these two readings or determinations could be compared to obtain the total number of revolutions required of the rotary table per foot of formation drilled.

The drum rotating means is shown rather schematically, and it seems obvious that any suitable mechanism could be used. That disclosed in the present invention is somewhat similar to the rack and ratchet mechanism on the common typewriter.

By observing the total number of revolutions per unit of formation drilled the operator can determine when his drill bit is dull, or when to use a particular type of bit. For example, say that a chart on a previous well on the same location showed that at a particular depth 800 R. P. M. were required to drill a normal amount of hole; however, the driller on the present well at the same depth notices that 2600 R. P. M. are required to drill a normal amount of hole. By this increase the driller can tell that something is wrong, such as, the drill bit is dull, or the like. Therefore, drill bits can be changed and the drilling proceed. This information would save time and therefore money during the drilling operations.

If desirable, a punch clock of any suitable construction could be used to impress time on the chart to show when a particular happening occurred.

A chart obtained in practicing the form of the invention illustrated in the accompanying drawings is illustrated in Fig. 2. As the stylus 38 moves horizontally across the chart to indicate revolutions of the drill stem, the sweep arm 34 is moving downwardly in accordance with the movement of the drill stem through the formation. As the sweep arm 34 contacts the stylus 38 it will stop its movement across the chart as illustrated at 50. The stylus will be moved back to zero along the same line and the drum rotated by the arm 34 contacting the drum rotating means. The stylus is then in position to start its movement across the chart until it is stopped and moved back to zero by the sweep arm 34. Since the sweep arm moves through a predetermined amount of travel which corresponds to a certain unit of travel of the drill stem through the formation, a glance at the chart will show the number of revolutions of the drill stem to travel a certain distance downwardly through the formation. Similarly, a chart could be made to compare determinations obtained by other means, such as photographic means, etc.

While the invention has been described wherein the sweep arm 34 is arranged so that is moves through one foot of downward movement of the drill stem through the formation, it seems obvious that any predetermined distance could be used.

Broadly, the invention contemplates a drilling rate recorder which compares the number of revolutions of a drill stem suspended in a derrick required to advance said drill stem a predetermined distance in a formation being drilled.

What is claimed is:

1. In a rotary well apparatus for measuring the total number of revolutions of the drill bit per unit of formation through which the bit is drilled comprising, means for determining the total number of revolutions of the drill bit, means for determining the amount of penetration of the drill bit in the formation and means for comparing said means for determining the total number of revolutions with said means for determining the amount of penetration of the drill bit so that a record of the number of revolutions per unit of penetration is obtained.

2. In a rotary drilling installation which includes a derrick with a traveling block suspended therein and a drill stem supported thereby and a rotary to rotate the drill stem, a cable connected to said block, a pulley over which said line is passed to rotate said pulley as said traveling block is moved relative to said derrick, means to indicate total revolutions of said rotary, and additional means operatively connected to said pulley to indicate the total amount of downward movement of said drill stem.

3. In a rotary drilling installation which includes a derrick with a traveling block suspended therein and a drill stem supported thereby and a rotary to rotate the drill stem, a cable connected to said block, a pulley over which said line is passed to rotate said pulley as said traveling block is moved relative to said derrick, means to indicate total revolutions of said rotary, and additional means operatively connected to said pulley to indicate a predetermined unit amount of movement thereof, said pulley movement indicating means being coordinated with said revolution indicating means whereby the number of revolutions per unit of downward movement of said block is determinable.

4. A drilling rate recorder to determine the total number of revolutions required of a drill stem suspended in a derrick by a traveling block to travel a predetermined distance through earth formations including means movable in response to movement of said traveling block as an indication of downward movement of said drill stem into the formation being drilled, means movable in response to rotation of said drill stem, means to indicate a predetermined amount of downward movement of said drill stem, and means to indicate the total number of revolutions required to travel said predetermined distance through the formation.

5. A drilling rate device which compares the total number of revolutions of a drill stem and drill bit secured thereto suspended in a derrick by a traveling block with a predetermined travel of the traveling block which is an indication of the rate of downward movement of said drill stem into the formation being drilled including means for determining a predetermined travel of said traveling block, means to determine the total number of revolutions of said drill stem required to travel said predetermined distance and means coacting with the last-mentioned means to obtain a new determination of the total revolutions of the drill stem required to travel the same distance as said predetermined distance through the formation.

6. A drilling rate device for obtaining a chart to compare such chart obtained with additional charts obtained in a similar manner to determine the condition of a drill bit secured on a drill stem suspended in a derrick by a traveling block including means for determining and charting the total revolutions of said drill stem, means for determining and charting a predetermined distance of downward travel of said traveling block, and additional means which coordinates and charts said revolution indicating means with said distance indicating means whereby the number of revolutions of the drill stem per unit of travel of said block is established.

7. A drilling rate device for obtaining a chart to compare such chart obtained with additional charts obtained in a similar manner to determine whether the number of revolutions required to drill a predetermined distance at a selected depth is increasing or decreasing as an indication of the cutting quality of a drill bit secured on a drill stem suspended in a derrick by a traveling block including means for determining and charting the total revolutions of said drill stem, means for determining and charting a predetermined distance of downward travel of said traveling block, and additional means which coordinates and charts said revolution indicating means with said distance indicating means whereby the number of revolutions per unit of travel of said block is established.

8. A method of determining the drilling rate of a formation in the drilling of wells by the rotary method wherein a derrick suspends a traveling block which has the drill pipe supported therein comprising the steps of, advancing the drill pipe a predetermined distance through said formation being drilled, and instrumentally measuring the total number of revolutions required of said drill pipe to advance said predetermined distance.

9. In a rotary well drilling apparatus including a derrick, a rotary table, and a traveling block for supporting a drill pipe for movement thereof, a recorder apparatus comprising a rotatable shaft, a sheave mounted thereon, a sweep arm also mounted on said shaft, a cable extending from said traveling block around said sheave to rotate said sheave upon movement of said traveling block, a one-way clutch mounted on said shaft between said sheave and said sweep arm so that only downward movement of said block imparts movement to said sweep arm, means for transmitting rotational movement of said rotary table to a recording device for recording the revolutions of said rotary table on a chart, and said sweep arm upon each revolution thereof returning said recording device to a base line on said chart, whereby the total number of revolutions per unit of downward movement of said block is recorded.

10. A recorder apparatus for recording the total revolutions of a drill pipe per unit of downward travel thereof comprising, a shaft, a sweep arm thereon, means for revolving said sweep arm upon downward movement only of the drill pipe, a chart for recording the total revolutions of the drill pipe, an indicator for recording the total revolutions on said chart, and said sweep arm upon each revolution thereof returning said indicator to a base line on said chart, whereby the total number of revolutions per unit of downward movement of said drill pipe is recorded.

ALONZO L. SMITH.

REFERENCES CITED

The following references are of record in the file of this patent:

UNITED STATES PATENTS

| Number | Name | Date |
|---|---|---|
| Re. 21,297 | Mizell | Dec. 12, 1939 |
| 367,625 | Haynes | Aug. 2, 1887 |
| 2,164,993 | Lewis | July 4, 1939 |
| 2,322,478 | Scherbatskoy | June 22, 1943 |
| 2,365,014 | Silverman et al. | Dec. 12, 1944 |

FOREIGN PATENTS

| Number | Country | Date |
|---|---|---|
| 775,276 | France | Dec. 22, 1934 |